United States Patent [19]

Lu

[11] Patent Number: 4,621,014

[45] Date of Patent: Nov. 4, 1986

[54] BIAXIALLY ORIENTED POLYOLEFIN FILMS WITH ETHYLENE-VINYL ALCOHOL BARRIER LAYER

[75] Inventor: Pang-Chia Lu, Pittsford, N.Y.

[73] Assignee: Mobil Oil Corporation, New York, N.Y.

[21] Appl. No.: 686,811

[22] Filed: Dec. 27, 1984

[51] Int. Cl.[4] .............................................. B32B 27/08
[52] U.S. Cl. .................................... 428/216; 428/516; 428/476.9; 428/518; 264/176.1
[58] Field of Search ............ 428/518, 216, 516, 476.9

[56] References Cited

U.S. PATENT DOCUMENTS

| | | | |
|---|---|---|---|
| 3,882,259 | 5/1975 | Nohara et al. | 428/35 |
| 4,064,296 | 12/1977 | Bornstein et al. | 428/35 |
| 4,347,332 | 8/1982 | Odorzynski et al. | 428/474.4 X |

*Primary Examiner*—P. C. Ives
*Attorney, Agent, or Firm*—Alexander J. McKillop; Michael G. Gilman; Edward J. Trojnar

[57] ABSTRACT

Polypropylene films having a coextruded ethylene-vinyl alcohol (EVAL) layer cannot be readily oriented because the orientation temperature for the EVAL layer is somewhat higher. By adding an aryl sulfonamide, such as p-toluenesulfonamide to the EVAL layer its orientation temperature is reduced enabling orientation of the composite film.

12 Claims, No Drawings

BIAXIALLY ORIENTED POLYOLEFIN FILMS WITH ETHYLENE-VINYL ALCOHOL BARRIER LAYER

CROSS-REFERENCE TO RELATED APPLICATIONS

U.S. application Ser. No. 454,203 filed Dec. 28, 1982, now abandoned, which is incorporated herein by reference discloses biaxially oriented films of polypropylene, for example, containing an ethylene-vinyl alcohol (EVAL) barrier layer in which the EVAL layer contains a polymeric additive to render it biaxially orientable.

BACKGROUND OF THE INVENTION

Polypropylene films are common packaging materials because of their relative low cost and moisture resistance. However, polypropylene has a fairly high permeability to gases, including oxygen. Therefore, films composed entirely of polypropylene are not adequate for packaging oxygen sensitive foods and other materials that degrade in the presence of oxygen or other atmospheric gases.

Schroeder et al, U.S. Pat. No. 4,254,169, the entire disclosure of which is expressly incorporated herein by reference, describes the use of an ethylene vinyl alcohol layer (EVAL) as an oxygen barrier layer. The EVAL layer sandwiched between two layers of polyolefin in a coextruded multi-layer film. The multi-layer film of the Schroeder, et al patent is not biaxially oriented.

Odorzynski et al, U.S. Pat. No. 4,347,332, discloses films with EVAL barrier layers which are modified with additives such as toluenesulfonamides. U.S. Pat. No. 4,347,332 is incorporated herein by reference.

In order to achieve optimal oxygen impermeability in a multi-layer film such as described in the above-mentioned Schroeder patent, it is necessary to use an ethylene vinyl alcohol copolymer having a relatively high vinyl alcohol to ethylene monomeric ratio. But such films have extremely poor rheology characteristics compared with polypropylene films. Consequently, composite films containing polypropylene and ethylene vinyl alcohol copolymer are not readily biaxially orientable.

SUMMARY OF THE INVENTION

Biaxially oriented multilayer polyolefin films including a sandwiched oxygen barrier layer of ethylene-vinyl alcohol polymer (EVAL) are prepared by blending an aryl sulfonamide with the EVAL to reduce the temperature at which it can be oriented to the temperature range in which the polyolefin is oriented.

DETAILED DESCRIPTION OF THE INVENTION

The biaxially oriented films of this invention comprise:
(A) two outer layers composed of oxygen-permeable polyolefin; and
(B) an oxygen barrier layer sandwiched between said (A) layers comprising a blend of:
an ethylene vinyl alcohol copolymer and an aromatic sulfonamide.

The multi-layer films of the present invention contain an oxygen barrier layer composed of a blend of ethylene vinyl alcohol and a different polymer. This oxygen barrier layer may be characterized as a core layer. Due to the excellent oxygen barrier properties associated with the ethylene vinyl alcohol component of this core layer, this layer may be quite thin, in the range of 0.1 mil or less, while still providing adequate oxygen barrier properties.

Suitable ethylene vinyl alcohol copolymers have no more than about 70 mole % of ethylene, the remainder being essentially vinyl alcohol. A preferred ethylene vinyl alcohol copolymer has from about 28 to about 36 mole % of ethylene.

Kuraray of Japan produces an ethylene vinyl alcohol copolymer under the designation "EP-F" which has 32 to 36 mole % ethylene, a molecular weight of 29,500 and a melting point of 356° F.

Other manufacturers produce suitable ethylene vinyl alcohol copolymers. One suitable copolymer has about 29 mole % ethylene, a molecular weight of 22,000, and a melting point of 365° F.

Exemplary of aromatic sulfonamides useful in this invention include particularly toluenesulfonamides and N-substituted toluene sulfonamides such as o,p-toluenesulfonamides and N-ethyl-o,p-toluenesulfonamides (available from Monsanto as Santicizer 9 and 8, respectively). The aromatic sulfonamide is used in an amount effective to render the EVAL layer biaxially orientable along with the polyolefin layers. Generally, the aromatic sulfonamide is present in amounts of 5 to 25 weight percent of the EVAL containing layer.

The preferred polyolefin for use in this invention is polypropylene but blends containing polypropylene, and other polyolefins are also suitable.

The core, oxygen barrier layer is preferably composed entirely of a blend of EVAL and aryl sulfonamide is preferably bonded to the outer layers of polyolefin by means of adhesion promoting layers. However, less preferably, an adhesion promoting component may be blended along with the EVAL in the core layer and the core layer can be bonded directly to the outer polyolefin layers. The blending of an adhesion promoting component into an EVAL core layer is described in the Nohara et al U.S. Pat. No. 3,882,259, the entire disclosure of which is expressly incorporated herein by reference.

The adhesion promoting layer which can be used is preferably a modified polyolefin as described in the Schroeder U.S. Pat. No. 4,254,169. More particularly, such modified polyolefins which form layers adjacent the core layer are blends of polyolefin and a graft copolymer of high density polyethylene (HDPE) with an unsaturated fused ring carboxylic acid anhydride. The polyolefin component of the blend may include a number of resins such as high, medium and low density polyethylene (HDPE, MDPE, LDPE), and polyolefin copolymers such as ethylene vinyl acetate copolymer (EVA) and ethylene acrylic acid (EAA). Modified polyolefin blends are disclosed in U.S. Pat. Nos. 4,087,587 and 4,087,588. Suitable modified polyolefin blends are available from the Chemplex Company of Rolling Meadows, Ill. under the name Plexar. Commercially available grades of such modified polyolefins are blends of the graft copolymer with different polyolefins. These include Plexar-I, a blend with ethylene vinyl acetate copolymer; Plexar-II, a blend with high density polyethylene; Plexar-II further modified with an elastomer such as polyisobutylene; and Plexar-III, a blend with ethylene vinyl acetate polymer adapted for cast film coextrusion. It has been found that these materials coextrude well with extrusion grades of ethylene vinyl alcohol without need for adding materials to either the polyolefin or the core layers in order to obtain the desired level of adhesion between layers.

The melting and softening temperatures of the EVAL are generally higher than the melting and softening temperatures of the polyolefin of the outer layers. Generally, the melting point of the EVAL is from about 170° to about 190° C., the melting point of the polyolefin is from about 150° to about 170° C.

In a preferred process for the production of the multi-layer film, resins of the polyolefin, modified polyolefin and the core barrier material are melted and coextruded as a cast film. Blown film coextrusion and water quench coextrusion may also be utilized. All such coextrusion processes yield a multi-layer film which has excellent adhesion between the layers and high resistance to passage of gas and moisture. Heat sealing of polyolefin outer layers is readily obtained. Thus, the multi-layer film product is well adapted to use in packaging food products as well as many non-food products which require moisture and oxygen barrier packaging.

Biaxial orientation of the coextruded, composite film can be by any suitable means as is well within the skill of those having ordinary skill in the art. Kordera et al, U.S. Pat. No. 4,294,935, the entire disclosure of which is expressly incorporated herein by reference, describes the biaxial orientation of ethylene vinyl alcohol films.

The multi-layer film of the present invention can have a wide range of thicknesses, e.g., from about 0.5 to about 5 mils. The oxygen barrier layer can constitute from about 5% to about 20%, preferably about 10% by weight, of the multi-layer film. The adhesion promoting layers, when present, may each constitute from abut 2% to about 10%, preferably about 5%, by weight of the multi-layer film in equal portions. The remainder of the multi-layer film is preferably constituted by the outer polyolefin layers in equal portions.

Although the various layers described herein have often been characterized as being "composed of" certain resins, it will be understood that these resins may include minor portions of various additives associated with these resins such as fillers, pigments, stabilizers, etc.

Containers can be made from the multi-layer films of the present invention. For example, the films can be heat sealed to form a pouch or by thermoformed to make containers in which foods are packaged and stored.

This invention is illustrated by the following examples.

EXAMPLE 1

Ethylene-vinyl alcohol grade-EPF available from Kuraray (EVAL-EPF) cannot be oriented at temperatures below about 180° C. (360° F.). A mixture of EVAL-EPF containing 20% by weight of p-toluene sulfonamide (Santicizer 9 from Monsanto) was streachable at 155° C. (310° F.). Accordingly, the blend could be coextruded with polypropylene and the composite film could be biaxially oriented at typical temperatures used for orienting polypropylene, e.g., about 160° C. (320° F.).

EXAMPLE 2

The EVAL-EPF blend with p-toluene sulfonamide (PTS) in Example 1 is coextruded with Arco 8670, a polypropylene having a melting point of about 160° C. (i.e. about 320° F.), and Plexar 2109, a modified polyolefin adhesive from Chemplex, to form a composite film of the structure: PP/Plexar 2109/EPF+PTS/Plexar 2109/PP in a weight ratio of approximately 40:5:10:5:40, where PP represents said polypropylene. This coextruded composite film is biaxially oriented at 160° C.

Although the present invention has been described with preferred embodiments, it is to be understood that modifications and variations may be restored to, without departing from the spirit and scope of this invention, as those skilled in the art will readily understand. Such modifications and variations are considered to be within the purview and scope of the appended claims.

I claim:

1. A biaxially oriented, polyolefin containing film comprising:
   (A) two outer layers comprising polyolefin; and
   (B) a polyamide-free oxygen barrier layer sandwiched between said (A) layers comprising an ethylene vinyl alcohol polymer and an amount of aromatic sulfonamide effective to render the ethylene vinyl alcohol layer orientable at temperatures suitable for the biaxial orientation of the polyolefin layers (A).

2. The film of claim 1 in which said polyolefin is polypropylene.

3. The film of claim 1 in which said aromatic sulfonamide is p-toluenesulfonamide.

4. The film of claim 1 in which said aromatic sulfonamide is N-ethyl-o,p-toluenesulfonamide.

5. The films of claim 1 in which ethylene vinyl alcohol copolymer has no more than about 70 mole % of ethylene, and melting and softening temperatures higher than said polyolefin of said outer layers.

6. The film of claim 5 in said ethylene vinyl alcohol copolymer has from about 28 to about 36 mole % of ethylene.

7. The film of claim 1 which contains in addition two adhesion promoting layers interposed between said outer polyolefin layers and said inner oxygen barrier layer.

8. The film of claim 7 in which said adhesion promoting layer is a polyolefin polymer or copolymer blended with a graft copolymer of polyethylene and an unsaturated fused ring carboxylic acid anhydride.

9. The film of claim 1 in which said polyolefin of said outer layers (A) has a melting point of from about 150° to about 170° C. and said ethylene vinyl alcohol copolymer has a melting point of from about 170° to about 190° C.

10. A biaxially oriented, polypropylene containing film structure consisting essentially of:
   (A) two outer layers composed of polypropylene;
   (B) one inner polyamide-free oxygen barrier layer comprising a blend of:
      an ethylene vinyl alcohol copolymer which has from about 28 to about 36 mole % of ethylene, the remainder being essentially vinyl alcohol;
      and a toluenesulfonamide; and
   (C) two adhesion promoting layers interposed between said outer polypropylene layers and said inner oxygen barrier layer, said adhesion promoting layers being composed of a polyolefin polymer or copolymer, blended with a graft copolymer of polyethylene and an unsaturated fused ring carboxylic acid anhydride, said oxygen barrier layer comprising from about 5% to about 20% by weight of said film structure, said adhesion promoting layers each comprising from about 2% to about 10% by weight of said film structure, and said toluene sulfonamide comprising from about 5% to about 25% by weight of said blend of ethylene vinyl alcohol and toluene sulfonamide.

11. The film of claim 10 in which said outer polypropylene layers each comprise about 40% by weight of said film said adhesion promoting layers each comprise about 5% by weight of said film structure and said oxygen barrier layer constitutes about 10% by weight of said film.

12. The film structure of claim 11 having a thickness from about 0.5 to about 5 mils.

* * * * *